Sept. 6, 1966     W. FISCHER ET AL     3,270,426
ADJUSTABLE GAUGE AND TEMPLATE
Filed Nov. 12, 1963     2 Sheets-Sheet 1
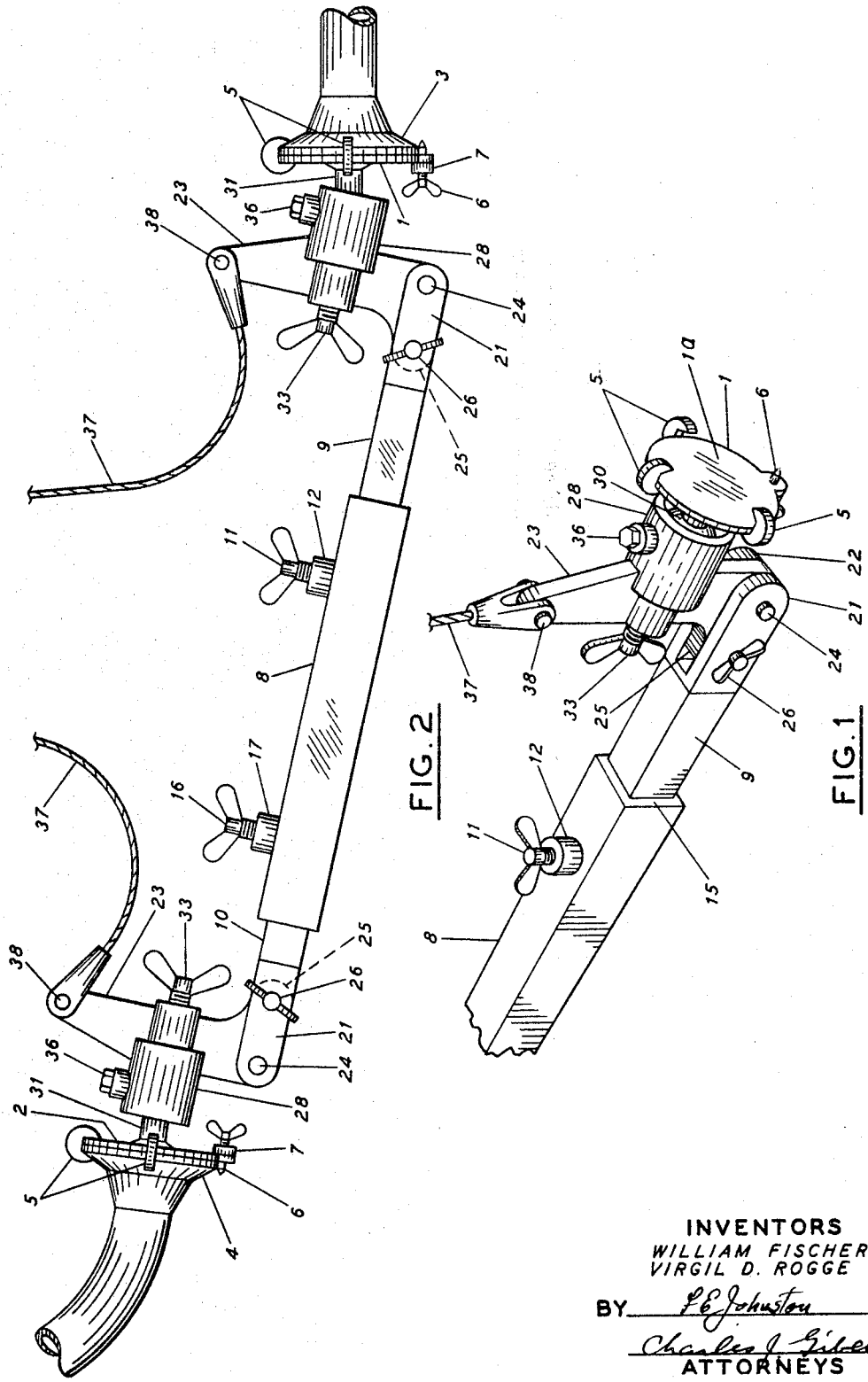
INVENTORS
WILLIAM FISCHER
VIRGIL D. ROGGE
BY *P.E. Johnston*
*Charles J. Gibeau*
ATTORNEYS Sept. 6, 1966   W. FISCHER ET AL   3,270,426
ADJUSTABLE GAUGE AND TEMPLATE
Filed Nov. 12, 1963   2 Sheets-Sheet 2

INVENTORS
WILLIAM FISCHER
VIRGIL D. ROGGE

BY *Leo Johnston*
   *Charles J. Gibeau*
   ATTORNEYS

United States Patent Office 3,270,426
Patented Sept. 6, 1966

3,270,426
ADJUSTABLE GAUGE AND TEMPLATE
William Fischer, Fullerton, and Virgil D. Rogge, La Habra, Calif., assignors to Chevron Research Company, a corporation of Delaware
Filed Nov. 12, 1963, Ser. No. 322,684
5 Claims. (Cl. 33—180)

This invention relates to an adjustable gauge for determining the spatial relationship between two randomly oriented pipe ends and to an adjustable template used in conjunction with the adjustable gauge to reproduce that spatial relationship at a location remote from the pipe ends. The template is then used in fabricating a pipe length shaped so as to connect the two pipe ends. The invention is particularly useful in conjunction with pipe ends located in adverse working environments such as under the sea.

Oil from a producing offshore well is generally transported through a pipeline lying on the ocean floor and extending from the well head to shore. When the pipeline has been constructed from the shore to a point in the vicinity of the well, a particularly troublesome problem has been the fabrication of a pipe length properly shaped to connect this pipeline to the short length of pipe extending from the well head. Because of irregularities in the ocean floor and the depth of water, seldom, if ever, will the pipes to be connected be in longitudinal alignment or will the planes of the pipe ends or flanges be parallel. It is important that the exact relative position of these two ends or flanges be determined in order to fabricate a tight-fitting connection. Any leaks in this connection would not only result in a loss of oil, but might cause a highly undesirable contamination of the ocean water.

Adjustable devices for measuring the relative position of two pipe ends are well known in the plumbing art. These devices, however, are not designed for use in an adverse environment such as exists under the sea. A deep-sea diver is severely restricted in his physical movements by his diving suit and by the extreme pressures to which he is subjected. Even the diver's mental ability is severely hampered at great depths. Therefore devices which require great force, dexterity, or alertness to operate although adequate for use in a normal environment are not satisfactory for use under the sea.

In the past it has sometimes been the practice for a deep-sea diver to first descend and examine the relative positions of the undersea pipe ends. The diver then surfaced and a connector was fabricated in accordance with the diver's estimate of the required shape. The diver then descended with the fabricated connector and attempted to put it in place. Since it was nearly impossible in most instances to estimate the relative position of the undersea pipe ends with the necessary accuracy, the connector generally did not fit and the connector was brought to the surface for modification in accordance with the diver's instructions. This trial and error approach usually necessitated numerous dives for fabrication of a proper connection. Such dives being dangerous, time-consuming, and expensive, this method was wholly unsatisfactory. Some divers used rope, flexible tubing, or other crude means to assist them in making their estimate. Although such means sometimes reduced the number of trials required, they did not provide a satisfactory solution to the problem.

Several attempts have been made to design an adjustable device for measuring rather than estimating, the relative position of the pipe ends under the sea. However, these devices were not satisfactory because they were difficult to manipulate, or had to be wedged into place between the two undersea pipes. Wedging is undesirable not only because of the force required but also because the adjustment is often lost in unwedging the device.

Problems similar to those described above also arise in other adverse environments where high temperatures, toxic fumes, radioactivity, etc. prevail.

It is the general object of this invention to provide a novel means for accurately and easily measuring the relative positions of two randomly oriented pipe ends and for reproducing this measurement at a location remote from the pipe ends.

Another object of this invention is to provide a novel adjustable gauge including two end plates which may be easily adjusted by a deep-sea diver to an infinite number of positions relative to each other, in order to be connected to two randomly oriented pipe ends or flanges at great depths under the sea and including novel means for easily separating the gauge from the pipes without loss of critical adjustment.

Another object of this invention is to provide a novel adjustable gauge for use by a deep-sea diver in measuring the relative position of the ends of two randomly oriented undersea pipes and a novel template for use in conjunction with the adjustable gauge to reproduce the relative positions of the end of the pipes above the surface of the water.

These and other objects and advantages of this invention will be apparent from the following detailed description of a preferred embodiment of the invention. Throughout this description, reference will be made to the accompanying drawings in which:

FIGURE 1 is a perspective view of one end of the gauge.

FIGURE 2 is an elevation view showing the gauge connected to two undersea pipes.

Figure 3:
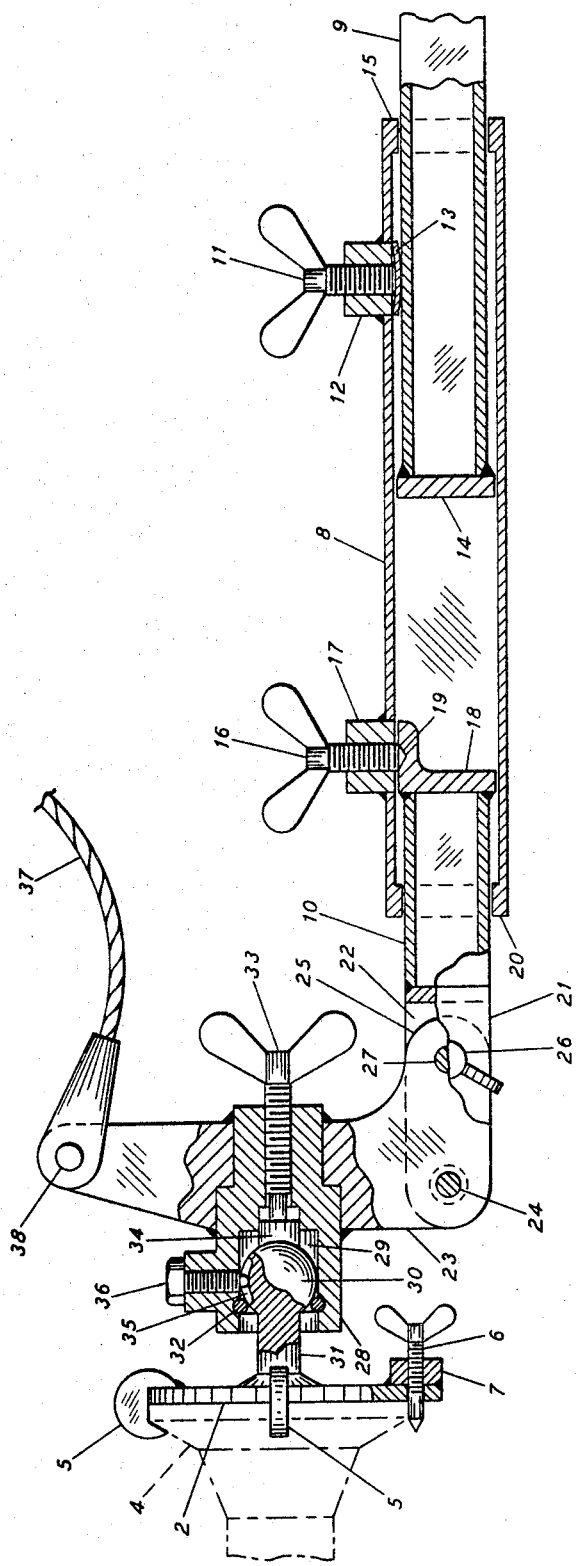
FIGURE 3 is an elongated view of one end of the gauge with portions broken away for clarity.

Referring to FIGURES 1 and 2, it may be seen that the gauge includes two end plates 1 and 2 each including a flat face 1a and 2a respectively adapted for attachment to two randomly oriented undersea pipe ends or flanges 3 and 4. Each end plate includes three hook-type clamps 5 rigidly connected to the plate and a screw 6. In the disclosed embodiment wings are shown on the screws to facilitate operation under adverse conditions. Each plate includes a rigid protrusion 7 with a threaded hole for receiving the screw. Thus the screw may be extended beyond the face of the end plate as shown in FIGURE 3 or retracted. The clamps 5 are arranged so as to permit each end plate to engage the pipe ends or flanges by translatory movement parallel to the face of the plate with the screw retracted. The screw may then be advanced to prevent removal of the plate from the pipe. As is apparent from FIGURE 3, the clamps 5 and screw 6 are spaced and shaped so as to ensure that the face of each plate fits tight against the end surface or flange of the pipe when the pipe ends are engaged.

The end plates are connected by a series of adjustable members. These connecting members will now be described.

The center portion of the gauge is an elongated rectangular tube 8. A second elongated rectangular tube 9 extends from one end of tube 8 and a third elongated rectangular tube 10 extends from the opposite end of tube 8. Tubes 9 and 10 are each telescopically connected to tube 8 for extension relative thereto. Tube 9 may be locked at any desired degree of extension by screw 11 which is threaded through protrusion 12 of tube 8. A friction plate 13 (FIGURE 3), connected along two edges to the inner face of protrusion 12, is flexed when contacted near its center by screw 11 as the screw is advanced, thus selectively engaging and locking tube 9 relative to tube 8. An end member 14 on tube 9 is sufficiently large to provide a relatively snug fit with tube 8 without preventing telescoping movement between the tubes. Tube 8 includes enlargements 15 at its end for the same purpose.

Tube 10 may be locked relative to tube 8 by operation of screw 16 which is threaded through protrusion 17 of tube 8. End angle-member 18, attached to tube 10, includes a conical recess 19 which coacts with a pointed end on screw 16 to lock tube 10 relative to tube 8. Like member 14, member 18 is sized to make a relatively snug fit. Enlargements 20 on tube 8 serve the same purpose as enlargements 15.

From the above description it is apparent that with screw 11 retracted tube 9 is free to extend to the right and retract to the left (as viewed in the drawings) relative to tube 8. Likewise with screw 16 retracted tube 10 is free to extend to the left and retract to the right. It is also apparent that screw 11 may be operated to lock tube 9 at any extended position relative to tube 8, while tube 10 may be locked only at one extended position, i.e., when recess 19 is aligned with screw 16.

The extended ends of tubes 9 and 10 are similar to each other, as is the connection between each of these tubes and its respective end plate. Therefore, the same reference numerals will be used to identify similar parts at each end.

As may best be seen in FIGURE 1, the extended end of tube 9 (and of tube 10) consists of a forked member with two flat horizontally spaced prongs 21, 22. An L-shaped member 23 is connected to prongs 21, 22 for pivotal movement about horizontal axis 24 and includes a leg 25 which passes between prongs 21, 22 as member 23 pivots about axis 24. A screw 26 is threaded through prong 21. The conical end of this screw cooperates with a conical recess 27 (FIGURE 3) in leg 25 thereby locking member 23 against pivoting about axis 24 when screw 26 is advanced.

Rigidly attached to each L-shaped member 23 is a cylinder 28 which includes a coaxial cylindrical socket 29 extending from the outer end of cylinder 28 toward its center. A ball 30 is rotatably mounted in each socket 29 and held in place by a retainer ring 32. A rod 31 is rigidly connected at one end to the ball and at its other end to one of the end plates on the side opposite the face of the plate. Cylinder 28 is shown as having a reduced diameter at the inner end. This serves to reduce the weight of device but is not essential to its operation. The inner end of each cylinder 28 includes a threaded hole and a screw 33 extending along its axis to socket 29 from the inner face of the cylinder. The end of each screw 33 includes a member 34 which has a friction face shaped to conform to the spherical surface of ball 30. Advancement of screw 33 locks ball 30, and thus end plate 1 or 2, against movement relative to L-shaped member 23.

When screw 33 is advanced the friction face of member 34 acts about a moment-arm equal to the radius of ball 30 to resist rotation about any axis transverse to that of screw 33. To resist rotation about the axis of screw 33, however, the friction face acts through a moment-arm less than the radius of ball 30. An antirotation lock is provided for each of the ball and socket joints to increase the resistance to such rotation. The antirotation lock is also designed to prevent rotation of either end plate about its own center whether screw 33 is advanced or retracted. The advantage of this feature will be pointed out below in the description of the operation of the gauge.

The anti-rotation locks each include a circumferential groove 35 in the top portion of each ball 30 extending in a plane which includes the longitudinal axis of rod 31. A bolt or setscrew 36 is threaded into a radial hole in each cylinder 28 and in radial alignment with the center of rotation of ball 30 so that the end of setscrew 36 engages in groove 35. The width of groove 35 is approximately the same as the diameter of the coacting end of setscrew 36. Thus setscrew 36 and the sides of groove 35 coact to prevent rotation of ball 30 about the axis of rod 31. Since rod 31 extends in the same general direction as screw 33, the anti-rotation device serves to assist member 34 in preventing rotation about the axis of screw 33.

Each ball 30 also will be limited in the extent of its rotation about axes other than that of screw 33 by rod 31 striking against the sides of socket 29. However, the socket diameter is large enough that this limitation does not interfere with normal operation of the gauge. Groove 35 is preferably of such a length that setscrew 36 will not strike the ends of the groove before rod 31 strikes the sides of the socket 29.

It should be noted that although the anti-rotation device prevents rotation of each end plate about its own center it does not prevent movement of the face of the end plate to any angle (within the defined limits) relative to member 23. This is because each ball 30 is free to rotate about two perpendicular axes. Thus the face of each end plate 1 and 2 is mounted for universal movement relative to its related member 23.

A line or rope 37 is connected to the top of each member 23 for pivotal movement about an axis 38. These lines extend to the surface of the water and are used to raise and lower the gauge.

Figure 4:
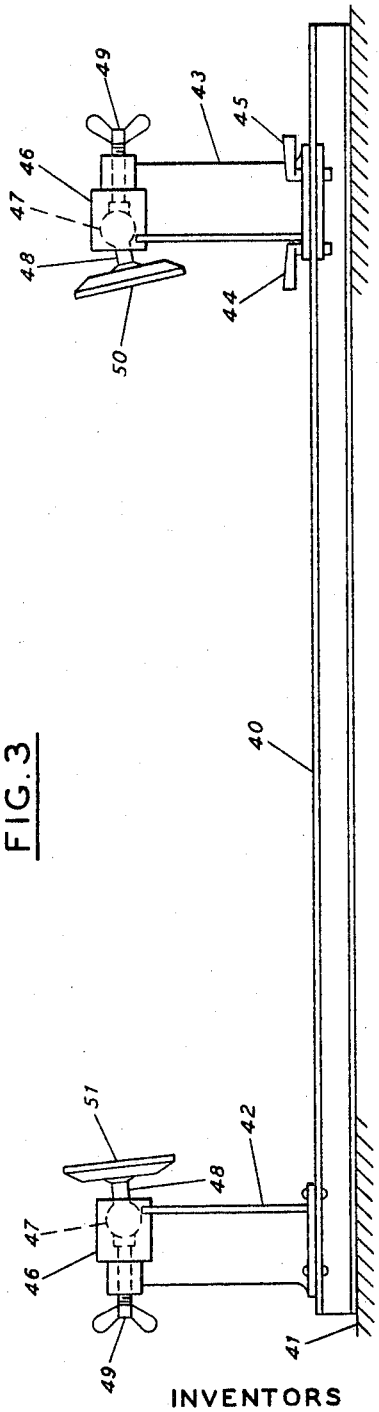
FIGURE 4 is an elevation view of the template board.

The template for use with the above described gauge is shown in FIGURE 4. It includes an elongated track 40 preferably rigidly connected to any solid surface above the water such as the deck 41 of the structure on which the connector will be fabricated. An upright 42 is rigidly attached to one end of track 40 and a second upright 43 is attached for sliding movement along track 40. Any means such as clamps 44 and 45 are provided for locking upright 43 at any desired position along track 40. Each upright 42, 43 includes a cylinder 46 rigidly connected thereto. Each cylinder includes a ball and socket joint 47, a rod 48, and a screw 49. These members are arranged in a manner similar to the ball and socket joint of the gauge described above, i.e., the screw includes a friction faced locking member and the ball is retained in the socket by a retainer ring. The joint need not include an anti-rotation lock similar to 35, 36 of the gauge, however, since the template is not subjected to the severe forces encountered by the gauge in lowering, raising, etc. Rigidly connected to each rod 48 is a plate 50 or 51. Each of these plates is similar in profile to the undersea pipe ends or flanges.

Each of screws 11, 16, 26, 33, and 49, like screw 6, is provided with wings to facilitate operation by hand.

A brief description of the operation of the above described preferred embodiment will be helpful to full appreciation of its advantages.

Before lowering the gauge into the water the two screws 6, the two screws 33 and screw 11 are retracted or loosened while the two screws 26 and screw 16 are advanced. Setscrew 36 remains in the advanced position throughout the operation. The condition of the gauge at this time is that the faces of end plates 1 and 2 are each free to move universally relative to L-shaped members 23, tube 9 is free to extend relative to tube 8, tube 10 is locked to tube 8, and both members 23 are locked against pivoting about axes 24. In this condition the gauge is lowered to the ocean floor near the pipe ends or flanges which it is desired to connect.

A deep-sea diver on the ocean floor attaches plate 2 to pipe end 4 and plate 1 to pipe end 3 with the faces of the plates tight against the pipe end faces or flanges. This is relatively simple no matter what the orientation of end 3 relative to end 4 (within the limits of movement of the gauge) because of the extensibility of tube 9 and the universal mobility of the face of each end member relative to the remainder of the gauge. The actual attachment is also made simple since the diver need only slide the end members along the faces of the pipe ends to engage hooks 5 and then advance screws 6. After the diver has connected the end members 1 and 2 to pipe ends 3 and 4, he advances both screws 33 and screw 11. Thus the gauge is locked in a position of adjustment which measures the spatial relationship of the undersea hubs.

To remove the gauge the diver releases or retracts screws 26, screw 16 and screws 6, thus permitting the end members to move freely relative to each other for easy release. The gauge is then returned to the surface where screws 26 are advanced to engage recesses 27 and screw 16 is advanced to engage recess 19, thus re-positioning end members 1 and 2 in the exact spatial relationship to which they were adjusted on the ocean floor. Screws 49 and clamps 44, 45 are then loosened on the template. One of the end members 1 or 2 is then connected to plate 51 so that the face of the end member is tight against the face of the plate and its screw 6 advanced. By movement of upright 43 along track 40 and movement of both ball and socket joints 47, plates 50 and 51 are then adjusted to such a position that the other end member may be connected tightly to plate 50 and the other screw 6 advanced. Locking of screws 49 and clamps 44, 45 then fixes plates 50 and 51 in a relative position exactly the same as the relative position of the undersea pipe ends or flanges 3, 4. A connector is then fabricated using the template as a guide.

As pointed out above the antirotation lock prevents rotation of either end plate about its own center at all times. Thus the gauge may always be connected to the undersea pipe ends with screw 6 of each end plate near the bottom of the face of each pipe end. Because of this the top or bottom of each end flange or face of the fabricated connector may be appropriately labeled to aid the diver in properly orienting the connector below the sea.

Thus it may be seen that the gauge and template together provide a means by which the relative position of two pipe ends may be accurately measured below the sea and reproduced above water. It may also be seen that the measurement requires no difficult mental or physical manipulations by the diver who need only slide an end member on each pipe end or flange, lock five screws, and then loosen five screws. Each screw includes wings large enough to permit easy hand operation under even the most adverse conditions.

It is apparent that modifications may be made to the above described embodiment within the teachings of this specification. It is therefore desired that the described embodiment of this invention be accepted as illustrative and not limiting, and that the scope of the invention be limited only to the definitions of the appended claims.

We claim:

1. An adjustable gauge for measuring the relative positions of two spaced apart pipe ends located in an adverse environment comprising a pair of end plates each including a face adapted for connection to a pipe end with the plate face tight against the pipe end, means connecting said end plates, said connecting means including adjustable means permitting variance of the distance and angle between said plate faces for connection to pipe ends disposed at various angles and distances relative to each other, selectively engageable means for locking said adjustable means against movement of said plate faces relative to each other after said plate faces are tightly connected to said pipe ends, releasable means separate from said engageable means permitting said plate faces to move relative to each other for easy release from said pipe ends with said engageable means locked, means preventing rotation of said end plates relative to said connecting means about an axis perpendicular to the corresponding said plate face when said plate faces are being connected to and released from said pipe ends, and means for re-engaging said releasable means only in one position so that said plate faces may be restored to the relative position which they assumed when attached to said pipe ends.

2. An adjustable gauge in accordance with claim 1 wherein said connecting means includes a first elongated member connected at one of its ends to the back side of a first of said end plates, a second elongated member connected at one of its ends to the back side of a second of said end plates, a third elongated member slidably interconnecting said first and second members in telescoping relationship with said third member for extension of said one end of said first member relative to one end of said third member and extension of said one end of said second member relative to the other end of said third member in the direction of their longitudinal axes to permit variance of the distance between said plate faces, means preventing rotation of said members relative to each other about their common longitudinal axis, said selectively engageable means includes means for locking said first elongated member at any position of extension relative to said third elongated member, and said releasable means includes means for locking said second elongated member at only one extended position relative to said third member and for releasing said second member from locked engagement with said third member to permit extension of said second member relative to said third member.

3. An adjustable gauge in accordance with claim 2 wherein the connection between said first member and said first end plate and the connection between said second member and said second end plate includes a first and second ball and socket joint respectively, means pivotally connecting said first joint to said first member with said first joint spaced laterally from the longitudinal axis of said first member, means pivotally connecting said second joint to said second member with said second joint spaced laterally from the longitudinal axis of said second member, said selectively engageable means also including means for locking each ball against movement relative to its socket, and said releasable means also including means for releasably locking each of said joints at only one pivotal position relative to the member to which it is connected and for releasing each of said joints from locked engagement to permit pivotal displacement relative to the member to which it is connected of each said joint from and to said one pivotal position.

4. An adjustable gauge in accordance with claim 1 wherein each of said end plates includes means for clamping to and releasing from a respective one of said pipe ends without rotational movement of said end plates about the longitudinal axis of the pipes.

5. An adjustable gauge in accordance with claim 4 wherein each of the locking means of said selectively engageable means and of said releasable means includes means to facilitate hand operation under adverse conditions.

References Cited by the Examiner

UNITED STATES PATENTS

| 224,401 | 2/1880 | Derickson | 33—161 |
| 2,232,824 | 2/1941 | Maher | 33—161 |
| 2,431,100 | 11/1947 | Woods | 33—174 |
| 2,976,617 | 3/1961 | Wilson | 33—143 |

FOREIGN PATENTS

| 347,410 | 1/1922 | Germany. |
| 395,852 | 5/1924 | Germany. |
| 9,137 | 1903 | Great Britain. |
| 27,794 | 1911 | Great Britain. |

LEONARD FORMAN, *Primary Examiner.*

ISAAC LISANN, *Examiner.*

W. D. MARTIN, *Assistant Examiner.*